United States Patent
You et al.

(10) Patent No.: US 9,517,795 B2
(45) Date of Patent: Dec. 13, 2016

(54) LANE KEEPING ASSIST SYSTEM OF VEHICLE AND METHOD OF CONTROLLING THE SAME

(71) Applicant: HYUNDAI MOBIS Co., Ltd., Yongin-si, Gyeonggi-do (KR)

(72) Inventors: Eun Young You, Yongin-si (KR); Kyu Hoon Lee, Ansan-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/942,432

(22) Filed: Nov. 16, 2015

(65) Prior Publication Data

US 2016/0137224 A1    May 19, 2016

(30) Foreign Application Priority Data

Nov. 19, 2014   (KR) ........................ 10-2014-0161858

(51) Int. Cl.
| | | |
|---|---|---|
| *A01B 69/00* | (2006.01) | |
| *B62D 15/02* | (2006.01) | |
| *B62D 6/00* | (2006.01) | |
| *B60R 1/00* | (2006.01) | |
| *G08G 1/16* | (2006.01) | |
| *B60W 30/12* | (2006.01) | |

(52) U.S. Cl.
CPC ............. *B62D 15/025* (2013.01); *B62D 6/003* (2013.01); *B60R 1/00* (2013.01); *B60R 2300/804* (2013.01); *B60W 30/12* (2013.01); *G08G 1/167* (2013.01)

(58) Field of Classification Search
CPC ...... B62D 15/025; B62D 6/003; B60W 10/20; B60W 30/12; B60R 2300/804; G08G 1/167; B60T 2201/08; B60T 2201/087
USPC . 701/36, 41, 65, 70; 340/435, 438; 180/168, 170, 443
See application file for complete search history.

(56) References Cited

U.S. PATENT DOCUMENTS

| | | | |
|---|---|---|---|
| 6,324,452 B1* | 11/2001 | Ikegaya | B62D 1/286 180/422 |
| 6,487,501 B1 | 11/2002 | Jeon | |
| 2002/0013647 A1* | 1/2002 | Kawazoe | B62D 1/28 701/41 |
| 2002/0041229 A1* | 4/2002 | Satoh | G05D 1/0246 340/438 |

FOREIGN PATENT DOCUMENTS

| | | |
|---|---|---|
| JP | 3559802 B2 | 9/2004 |
| KR | 10-1272424 B1 | 6/2013 |

* cited by examiner

*Primary Examiner* — Gertrude Arthur Jeanglaud
(74) *Attorney, Agent, or Firm* — Paratus Law Group, PLLC

(57) ABSTRACT

A lane keeping assist system, including: a first calculation unit which calculates left and right position errors of a front portion of the vehicle, a curvature of a lane of the front portion, and a head angle formed based on the lane from a front image of the vehicle captured by an image sensor, and calculates a target yaw rate using the left and right position errors, the curvature of the lane, and the head angle formed based on the lane which are calculated; a second calculation unit which calculates a steering torque control value for driving the calculated target yaw rate using vehicle condition information including front and rear yaw rates of the vehicle sensed by a yaw rate sensor, and a steering angle and a speed of the vehicle; and a steering driving unit which controls steering of the vehicle for keeping a lane.

14 Claims, 3 Drawing Sheets

LANE KEEPING ASSIST SYSTEM OF VEHICLE AND METHOD OF CONTROLLING THE SAME

CROSS-REFERENCE TO RELATED APPLICATION

This application claims priority to and the benefit of Korean Patent Application No. 10-2014-0161858, filed on Nov. 19, 2014, the disclosure of which is incorporated herein by reference in its entirety.

BACKGROUND

1. Field of the Invention

The present invention relates to a lane keeping assist system of a vehicle and a method of controlling the same.

2. Discussion of Related Art

Recently, a lane keeping assist system (LKAS) for assisting so that a vehicle is not deviated from a lane while driving is mainly being used as one among vehicle safety systems.

The LKAS estimates a motion of a vehicle using road information obtained by a front image sensor and vehicle condition information measured by a vehicle sensor, and assists lane departure prevention by controlling steering of the vehicle.

When a conventional LKAS is used, there is a problem in which a rear portion of a vehicle is sometimes deviated from a lane even when the system is operated in the vehicle having a great length since only the road information obtained using the front image sensor of the vehicle is used.

SUMMARY OF THE INVENTION

The present invention is directed to a lane keeping assist system (LKAS) which prevents lane departure by considering a rear portion of a vehicle according to a length of the vehicle, and a method of controlling the same.

The present invention is not limited to the object described above, and other objects which are not described will become more apparent to those of ordinary skill in the art by the following description.

According to one aspect of the present invention, there is provided a lane keeping assist system (LKAS), including: an image sensor configured to capture a front of a vehicle, and obtain a front image of the vehicle; a first calculation unit configured to calculate left and right position errors of a front portion of the vehicle, a curvature of a lane of the front portion of the vehicle, and a head angle formed based on the lane from the front image of the vehicle, and calculate a steering torque control value of the front portion of the vehicle using the left and right position errors of the front portion of the vehicle, the curvature of the lane of the front portion of the vehicle, the head angle formed based on the lane, which are calculated, and a vehicle speed; a second calculation unit configured to calculate left and right position errors of a rear portion of the vehicle, and a curvature of a lane of the rear portion of the vehicle, and calculate a steering torque control value of the rear portion of the vehicle using the left and right position errors of the rear portion of the vehicle, the curvature of the lane of the rear portion of the vehicle, the head angle formed based on the lane, which are calculated, and the vehicle speed; and a steering driving unit configured to determine a final steering torque control value of the vehicle using the steering torque control value of the front portion of the vehicle and the steering torque control value of the rear portion of the vehicle which are calculated, and control steering of the vehicle for lane keeping using the final steering torque control value.

The steering driving unit may determine a greater value between the steering torque control value of the front portion of the vehicle calculated in the first calculation unit and the steering torque control value of the rear portion of the vehicle calculated in the second calculation unit as the final steering torque control value.

The steering driving unit may calculate an average value of the steering torque control value of the front portion of the vehicle calculated in the first calculation unit and the steering torque control value of the rear portion of the vehicle calculated in the second calculation unit, and determine the calculated average value as the final steering torque control value of the vehicle.

The second calculation unit may calculate the left and right position errors and the curvature of the lane of the rear portion of the vehicle using the following equations, $$e21 = e11 - L1 * \sin \psi$$

$$e22 = e12 - L1 * \sin \psi$$

wherein, e21 and e22 represent the left and right position errors of the rear portion of the vehicle, e11 and e12 represent the left and right position errors of the front portion of the vehicle, $\psi$ represents the head angle formed based on the lane, and L1 represents a distance which is from one position of the front portion of the vehicle in which an image sensor is installed to another position which is one position of the rear portion of the vehicle.

The second calculation unit may calculate the left and right position errors and the curvature of the lane of the rear portion of the vehicle using the following equations, $$e21 = e11 - L2 * \sin \psi$$

$$e22 = e12 - L2 * \sin \psi$$

wherein, e21 and e22 represent the left and right position errors of the rear portion of the vehicle, e11 and e12 represent the left and right position errors of the front portion of the vehicle, $\psi$ represents the head angle formed based on the lane, and L2 represents a distance which is from one position of the front portion of the vehicle in which an image sensor is installed to another position which is one position located in the rear portion of the vehicle.

The second calculation unit may determine the curvature of the lane calculated at a position ahead of a distance between one position of the front portion of the vehicle and one position of the rear portion of the vehicle considering the vehicle speed as the curvature of the lane of the rear portion of the vehicle.

According to another aspect of the present invention, there is provided an LKAS, including: an image sensor configured to capture a front of a vehicle, and obtain a front image of the vehicle; a yaw rate sensor located in a front portion and a rear portion of the vehicle, and configured to sense a front yaw rate and a rear yaw rate of the vehicle; a first calculation unit configured to calculate left and right position errors of the front portion of the vehicle, a curvature of a lane of the front portion of the vehicle, and a head angle formed based on the lane from the front image of the vehicle, and calculate a target yaw rate using the left and right position errors of the front portion of the vehicle, the curvature of the lane of the front portion of the vehicle, and the head angle formed based on the lane which are calculated; a second calculation unit configured to calculate a steering torque control value for driving the calculated target yaw rate using vehicle condition information including the front and rear yaw rates of the vehicle, and a steering angle and a speed of the vehicle; and a steering driving unit configured to control steering of the vehicle for keeping a lane using the calculated steering torque control value.

The first calculation unit may generate a target trajectory using the left and right position errors of the front portion of the vehicle, the curvature of the lane, and the head angle formed based on the lane, and calculate the target yaw rate for tracking the target trajectory.

The LKAS may further include a steering angle sensor installed in a handle of the vehicle for sensing the steering angle of the vehicle.

The second calculation unit may calculate the steering torque control value using an average value of the front yaw rate and the rear yaw rate, and provide the calculated steering torque control value to the steering driving unit.

The second calculation unit may calculate the steering torque control value using a greater value between the front yaw rate and the rear yaw rate, and provide the calculated steering torque control value to the steering driving unit.

According to still another aspect of the present invention, there is provided a lane keeping assist method, including: capturing a front of a vehicle, and obtaining a front image of the vehicle; calculating left and right position errors of a front portion of the vehicle, a curvature of a lane of the front portion of the vehicle, and a head angle formed based on the lane from the obtained front image of the vehicle, and calculating a steering torque control value of the front portion of the vehicle using the left and right position errors of the front portion of the vehicle, the curvature of the lane of the front portion of the vehicle, the head angle formed based on the lane, which are calculated, and a vehicle speed; calculating left and right position errors of a rear portion of the vehicle, and a curvature of a lane of the rear portion of the vehicle, and calculating a steering torque control value of the rear portion of the vehicle using the left and right position errors of the rear portion of the vehicle, the curvature of the lane of the rear portion of the vehicle, the head angle formed based on the lane, which are calculated, and the vehicle speed; and determining a final steering torque control value of the vehicle using the steering torque control value of the front portion of the vehicle and the steering torque control value of the rear portion of the vehicle which are calculated, and controlling steering of the vehicle for lane keeping using the final steering torque control value.

The controlling of the steering of the vehicle may determine a greater value between the steering torque control value of the front portion of the vehicle and the steering torque control value of the rear portion of the vehicle which are calculated as the final steering torque control value.

The controlling of the steering of the vehicle may calculate an average value of the steering torque control value of the front portion of the vehicle and the steering torque control value of the rear portion of the vehicle which are calculated, and determine the calculated average value as the final steering torque control value of the vehicle.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The above and other objects, features, and advantages of the present invention will become more apparent to those of ordinary skill in the art by describing in detail exemplary embodiments thereof with reference to the accompanying drawings. However, the present invention is not limited to exemplary embodiments which will be described hereinafter, and can be implemented by various different types. Exemplary embodiments of the present invention are described below in sufficient detail to enable those of ordinary skill in the art to embody and practice the present invention. The present invention is defined by claims. Meanwhile, the terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, a lane keeping assist system (LKAS) of a vehicle and a method of controlling the same according to the present invention will be described in detail with reference to the accompanying drawings.

Figure 1A:
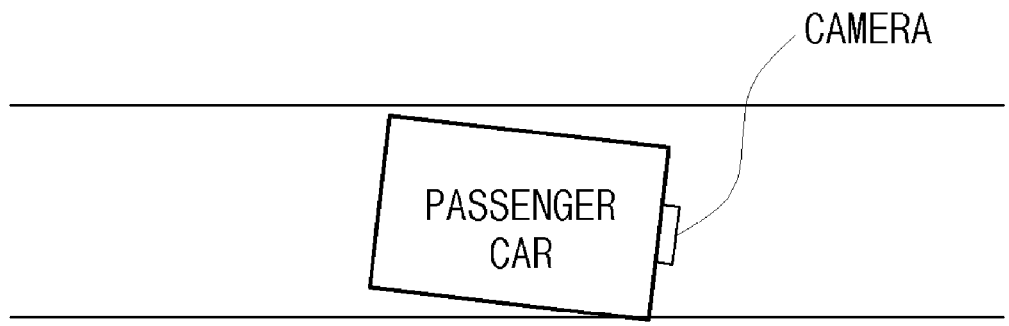
FIGS. 1A and 1B are diagrams for comparing lane keeping states using a lane keeping assist system (LKAS) installed in each of a passenger car and a truck.
Figure 1B:
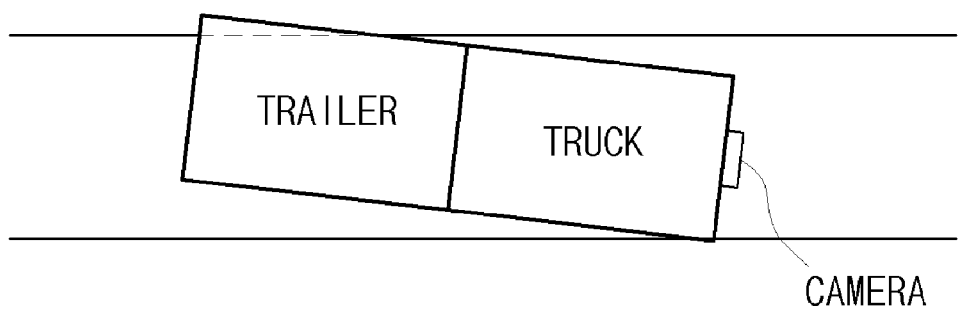

FIGS. 1A and 1B are diagrams for comparing lane keeping states using a lane keeping assist system (LKAS) installed in each of a passenger car and a truck.

As shown in FIGS. 1A and 1B, a conventional LKAS may assist lane keeping based on a front portion of a vehicle.

Accordingly, as shown in FIG. 1A, the conventional LKAS assisting the lane keeping based on the front portion of the vehicle may not have a serious problem when being applied to a vehicle having a small length, such as a passenger car, but as shown in FIG. 1B, may have a problem in which a rear portion of the vehicle is sometimes deviated from a lane when being applied to a vehicle having a great length, such as a truck. However, the prevent invention can prevent the problem.

Hereinafter, the LKAS of the vehicle according to one embodiment of the present invention will be described in detail with reference to FIGS. 2 and 3.

Figure 2:
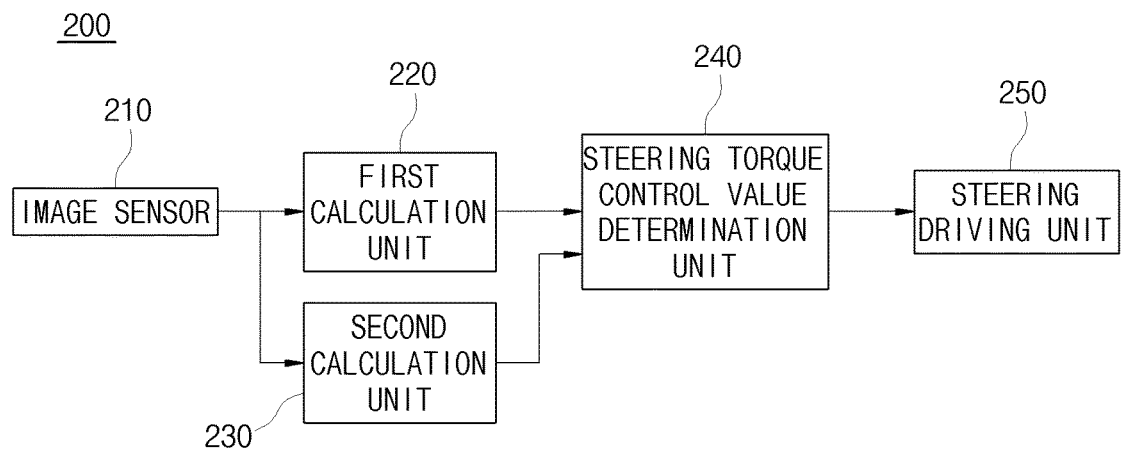
FIG. 2 is a block diagram illustrating a configuration of an LKAS of a vehicle according to one embodiment of the present invention.
Figure 3:
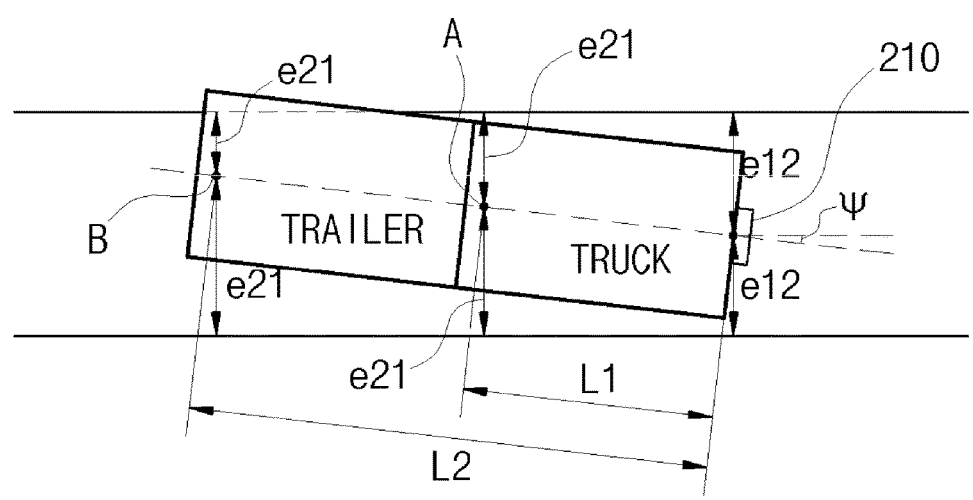
FIG. 3 is a reference diagram for describing a method of calculating a left and right position error in a rear portion of a vehicle according to an embodiment of the present invention.

FIG. 2 is a block diagram illustrating a configuration of an LKAS according to one embodiment of the present invention, and FIG. 3 is a reference diagram for describing a method of calculating a left and right position error of a rear portion of a vehicle according to an embodiment of the present invention.

As shown in FIG. 2, the LKAS 200 according to one embodiment of the present invention may include an image sensor 210, a first calculation unit 220, a second calculation unit 230, a steering torque control value determination unit 240, and a steering driving unit 250.

The image sensor 210 may be installed in a front lower portion of a vehicle, capture a front of the vehicle, and provide the captured front image to the first calculation unit 220.

The first calculation unit 220 may calculate left and right position errors e11 and e12 of a front portion of the vehicle, a curvature $\gamma 1$ of a lane of the front portion of the vehicle, and a head angle $\psi 1$ formed based on the lane from the front image provided from the image sensor 210, and calculate a steering torque control value of the front portion of the vehicle using the left and right position errors e11 and e12 of the front portion of the vehicle, the curvature $\gamma 1$ of the lane of the front portion of the vehicle, the head angle $\psi 1$ formed based on the lane, which are calculated, and a vehicle speed.

Here, the left and right position errors e11 and e12 of the front portion of the vehicle may be a distance which is away from a center of the lane based on a capturing center position of the image sensor 210, and the head angle $\psi 1$ may be an angle formed between a driving direction of the vehicle and the lane. At this time, the first calculation unit 220 may generate a target trajectory using the left and right position errors e11 and e12 of the front portion of the vehicle, the curvature $\gamma 1$ of the lane of the front portion of the vehicle, and the head angle $\psi 1$ formed based on the lane, and calculate the steering torque control value so that the front portion of the vehicle is driven at a target yaw rate along the target trajectory using vehicle condition information including a vehicle speed.

The second calculation unit 230 may calculate left and right position errors e21 and e22 of a rear portion of the vehicle, and a curvature $\gamma 2$ of the lane of the rear portion of the vehicle from the front image provided from the image sensor 210, and calculate a steering torque control value of the rear portion of the vehicle using the left and right position errors e21 and e22 of the rear portion of the vehicle, the curvature $\gamma 2$ of the lane of the rear portion of the vehicle, the head angle $\psi 1$ formed based on the lane which is calculated in the first calculation unit 220, and the vehicle speed.

At this time, the second calculation unit 230 may calculate the left and right position errors of the rear portion of the vehicle by the following Equations 1 and 2. Here, the following Equation 1 may be used when calculating the curvature lane and the position errors of the rear portion of the vehicle based on a position A in the rear portion of a truck shown in FIG. 3. Further, the following Equation 2 may be used when calculating the curvature of the lane and the position errors of the rear portion of the vehicle based on a position B in the rear portion of a trailer.

$$e21 = e11 - L1 \times \sin \psi$$

$$e22 = e12 - L1 \times \sin \psi \qquad \text{[Equation 1]}$$

Here, e21 and e22 may represent the left and right position errors of the rear portion of the vehicle, e11 and e12 may represent the left and right position errors of the front portion of the vehicle, L1 may represent a distance which is from one position of the front portion of the vehicle in which the image sensor 210 is installed to the position A, and the position A may represent one position of the rear portion of the truck.

$$e21 = e11 - L2 \times \sin \psi$$

$$e22 = e12 - L2 \times \sin \psi \qquad \text{[Equation 2]}$$

Here, e21 and e22 may represent the left and right position errors of the rear portion of the vehicle, e11 and e12 may represent the left and right position errors of the front portion of the vehicle, L2 may represent a distance which is from one position of the front portion of the vehicle in which the image sensor 210 is installed to the position B, and the position B may represent one position of the rear portion of the trailer.

The second calculation unit 230 may calculate a target trajectory using the left and right position errors e21 and e22 of the rear portion of the vehicle, the curvature $\gamma 2$ of the lane of the rear portion of the vehicle, and the head angle $\psi 1$ formed based on the lane which is calculated in the first calculation unit 220, and calculate a steering torque control value so that the rear portion of the vehicle is driven at a target yaw rate along the generated target trajectory using the vehicle condition information including the vehicle speed.

The second calculation unit 230 may determine the curvature of the lane calculated before the distance L1 or L2 is calculated as the curvature $\gamma 2$ of the lane of the rear portion of the vehicle using the vehicle speed.

The steering torque control value determination unit 240 may determine a final steering torque control value of the vehicle using the steering torque control value of the front portion of the vehicle calculated in the first calculation unit 220 and the steering torque control value of the rear portion of the vehicle calculated in the second calculation unit 230.

In detail, the steering torque control value determination unit 240 may determine a greater value between the steering torque control value of the front portion of the vehicle and the steering torque control value of the rear portion of the vehicle as the final steering torque control value of the vehicle.

Alternatively, the steering torque control value determination unit 240 may determine an average value of the steering torque control value of the front portion of the vehicle and the steering torque control value of the rear portion of the vehicle as the final steering torque control value of the vehicle.

The steering driving unit 250 may control the steering of the vehicle using the final steering torque control value determined by the steering torque control value determination unit 240.

Hereinafter, an LKAS of a vehicle according to another embodiment of the present invention will be described with reference to FIG. 4. Here, FIG. 4 is a block diagram illustrating a configuration of the LKAS of the vehicle according to another embodiment of the present invention.

Figure 4:
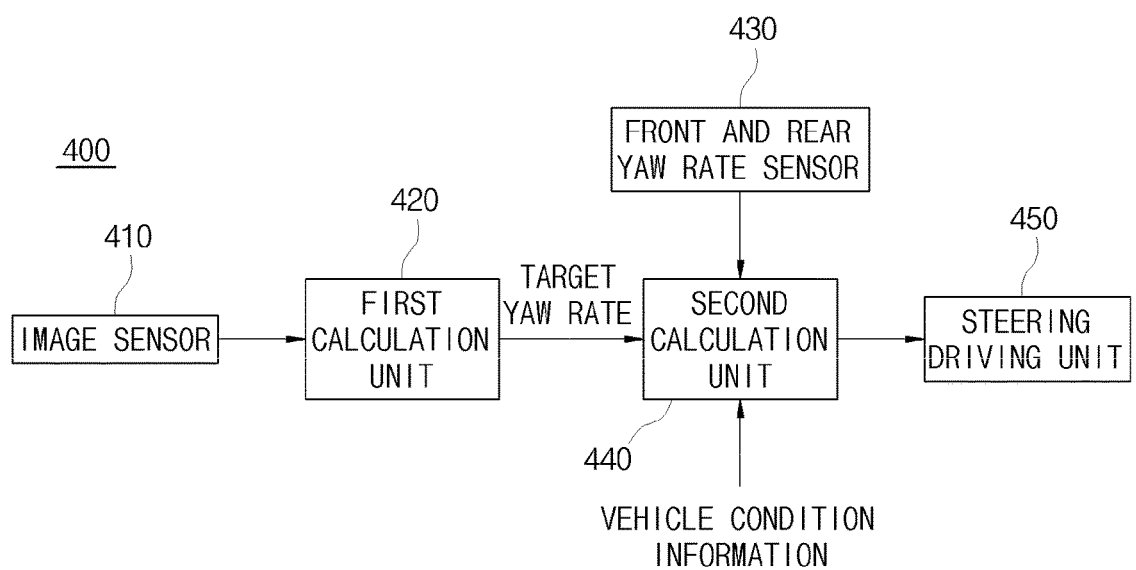
FIG. 4 is a block diagram illustrating a configuration of an LKAS of a vehicle according to another embodiment of the present invention.

As shown in FIG. 4, the LKAS 400 according to another embodiment of the present invention may include an image sensor 410, front and rear yaw rate sensors 430, a first calculation unit 420, a second calculation unit 440, and a steering driving unit 450.

The image sensor 410 may capture a front of the vehicle, and provide the captured front image to the first calculation unit 420.

The front and rear yaw rate sensors 430 may be installed in front and rear portions of the vehicle, respectively, and sense yaw rates of the front and rear portions of the vehicle, respectively. Here, the front and rear yaw rate sensors 430 may be installed in the positions A and B as shown in FIG. 3.

The first calculation unit 420 may calculate left and right position errors e11 and e12 of the front portion of the vehicle, a curvature γ1 of a lane of the front portion of the vehicle, and a head angle ψ1 formed based on the lane from the front image provided from the image sensor 410.

Further, the first calculation unit 420 may calculate a target trajectory using the left and right position errors e11 and e12 of the front portion of the vehicle, the curvature γ1 of the lane of the front portion of the vehicle, and the head angle ψ1 formed based on the lane, and calculate a target yaw rate so as to drive along the generated target trajectory.

The second calculation unit 440 may calculate a steering torque control value for driving at the target yaw rate calculated in the first calculation unit 420 using vehicle condition information including values of the yaw rates of the front and rear portions of the vehicle sensed by the front and rear yaw rate sensors 430, and a steering angle and a speed of the vehicle provided from a steering angle sensor and a speed sensor (not shown) installed in a handle of the vehicle, and provide the calculated steering torque control value to the steering driving unit 450.

Here, the second calculation unit 440 may calculate an average value of values of the yaw rates of the front and rear portions of the vehicle, and calculate a steering torque control value using the calculated yaw rate average value, the steering angle, and the vehicle speed.

Alternatively, the second calculation unit 440 may calculate the steering torque control value using a greater value between the values of the front and rear yaw rates, the steering angle, and the vehicle speed.

Accordingly, the steering driving unit 450 may perform an autonomous driving while keeping the lane exactly by controlling the steering of the vehicle using the steering torque control value provided from the second calculation unit 440.

According to the present invention, the lane departure prevention of the vehicle can be achieved by considering the rear portion of the vehicle.

It will be apparent to those skilled in the art that various modifications can be made to the above-described exemplary embodiments of the present invention without departing from the spirit or scope of the invention. Accordingly, the exemplary embodiments of the present invention is for the purpose of describing particular embodiments only and is not intended to be limiting of the invention, and the scope of the present invention is not limited by the exemplary embodiments of the present invention. The scope of the present invention should be defined by the claims, and it is intended that the present invention covers all such modifications provided they come within the scope of the appended claims and their equivalents.

What is claimed is:

1. A lane keeping assist system (LKAS), comprising:
an image sensor configured to capture a front of a vehicle, and obtain a front image of the vehicle;
a first calculation unit configured to calculate left and right position errors of a front portion of the vehicle, a curvature of a lane of the front portion of the vehicle, and a head angle formed based on the lane from the front image of the vehicle, and calculate a steering torque control value of the front portion of the vehicle using the left and right position errors of the front portion of the vehicle, the curvature of the lane of the front portion of the vehicle, the head angle formed based on the lane, which are calculated, and a vehicle speed;
a second calculation unit configured to calculate left and right position errors of a rear portion of the vehicle, and a curvature of a lane of the rear portion of the vehicle, and calculate a steering torque control value of the rear portion of the vehicle using the left and right position errors of the rear portion of the vehicle, the curvature of the lane of the rear portion of the vehicle, the head angle formed based on the lane, which are calculated, and the vehicle speed; and
a steering driving unit configured to determine a final steering torque control value of the vehicle using the steering torque control value of the front portion of the vehicle and the steering torque control value of the rear portion of the vehicle which are calculated, and control steering of the vehicle for lane keeping using the final steering torque control value.

2. The LKAS of claim 1, wherein the steering driving unit determines a greater value between the steering torque control value of the front portion of the vehicle calculated in the first calculation unit and the steering torque control value of the rear portion of the vehicle calculated in the second calculation unit as the final steering torque control value.

3. The LKAS of claim 1, wherein the steering driving unit calculates an average value of the steering torque control value of the front portion of the vehicle calculated in the first calculation unit and the steering torque control value of the rear portion of the vehicle calculated in the second calculation unit, and determines the calculated average value as the final steering torque control value of the vehicle.

4. The LKAS of claim 1, wherein the second calculation unit calculates the left and right position errors and the curvature of the lane of the rear portion of the vehicle using the following equations, $$e21 = e11 - L1 * \sin \psi$$

$$e22 = e12 - L1 * \sin \psi$$

wherein e21 and e22 represent the left and right position errors of the rear portion of the vehicle, e11 and e12 represent the left and right position errors of the front portion of the vehicle, ψ represents the head angle formed based on the lane, and L1 represents a distance which is from one position of the front portion of the vehicle in which an image sensor is installed to another position which is one position of the rear portion of the vehicle.

5. The LKAS of claim 1, wherein the second calculation unit calculates the left and right position errors and the curvature of the lane of the rear portion of the vehicle using the following equations, $$e21 = e11 - L2 * \sin \psi$$

$$e22 = e12 - L2 * \sin \psi$$

wherein e21 and e22 represent the left and right position errors of the rear portion of the vehicle, e11 and e12 represent the left and right position errors of the front portion of the vehicle, ψ represents the head angle formed based on the lane, and L2 represents a distance which is from one position of the front portion of the vehicle in which an image sensor is installed to another position which is one position located in the rear portion of the vehicle.

6. The LKAS of claim 1, wherein the second calculation unit determines the curvature of the lane calculated at a position ahead of a distance between one position of the front portion of the vehicle and one position of the rear portion of the vehicle considering the vehicle speed as the curvature of the lane of the rear portion of the vehicle.

7. A lane keeping assist system (LKAS), comprising:
   an image sensor configured to capture a front of a vehicle, and obtain a front image of the vehicle;
   a yaw rate sensor located in a front portion and a rear portion of the vehicle, and configured to sense a front yaw rate and a rear yaw rate of the vehicle;
   a first calculation unit configured to calculate left and right position errors of the front portion of the vehicle, a curvature of a lane of the front portion of the vehicle, and a head angle formed based on the lane from the front image of the vehicle, and calculate a target yaw rate using the left and right position errors of the front portion of the vehicle, the curvature of the lane of the front portion of the vehicle, and the head angle formed based on the lane which are calculated;
   a second calculation unit configured to calculate a steering torque control value for driving the calculated target yaw rate using vehicle condition information including the front and rear yaw rates of the vehicle, and a steering angle and a speed of the vehicle; and
   a steering driving unit configured to control steering of the vehicle for keeping a lane using the calculated steering torque control value.

8. The LKAS of claim 7, wherein the first calculation unit generates a target trajectory using the left and right position errors of the front portion of the vehicle, the curvature of the lane, and the head angle formed based on the lane, and calculates the target yaw rate for tracking the target trajectory.

9. The LKAS of claim 7, further comprising:
   a steering angle sensor installed in a handle of the vehicle for sensing the steering angle of the vehicle.

10. The LKAS of claim 7, wherein the second calculation unit calculates the steering torque control value using an average value of the front yaw rate and the rear yaw rate, and provides the calculated steering torque control value to the steering driving unit.

11. The LKAS of claim 7, wherein the second calculation unit calculates the steering torque control value using a greater value between the front yaw rate and the rear yaw rate, and provides the calculated steering torque control value to the steering driving unit.

12. A lane keeping assist method, comprising:
    capturing a front of a vehicle, and obtaining a front image of the vehicle;
    calculating left and right position errors of a front portion of the vehicle, a curvature of a lane of the front portion of the vehicle, and a head angle formed based on the lane from the obtained front image of the vehicle, and calculating a steering torque control value of the front portion of the vehicle using the left and right position errors of the front portion of the vehicle, the curvature of the lane of the front portion of the vehicle, the head angle formed based on the lane, which are calculated, and a vehicle speed;
    calculating left and right position errors of a rear portion of the vehicle, and a curvature of a lane of the rear portion of the vehicle, and calculating a steering torque control value of the rear portion of the vehicle using the left and right position errors of the rear portion of the vehicle, the curvature of the lane of the rear portion of the vehicle, the head angle formed based on the lane, which are calculated, and the vehicle speed; and
    determining a final steering torque control value of the vehicle using the steering torque control value of the front portion of the vehicle and the steering torque control value of the rear portion of the vehicle which are calculated, and controlling steering of the vehicle for lane keeping using the final steering torque control value.

13. The lane keeping assist method of claim 12, wherein the controlling of the steering of the vehicle determines a greater value between the steering torque control value of the front portion of the vehicle and the steering torque control value of the rear portion of the vehicle which are calculated as the final steering torque control value.

14. The lane keeping assist method of claim 12, wherein the controlling of the steering of the vehicle calculates an average value of the steering torque control value of the front portion of the vehicle and the steering torque control value of the rear portion of the vehicle which are calculated, and determines the calculated average value as the final steering torque control value of the vehicle.

* * * * *